United States Patent

Suzuki

[11] Patent Number: 5,783,004
[45] Date of Patent: Jul. 21, 1998

[54] MOTORCYCLE TIRE WITH THREE BELT PLIES

[75] Inventor: Shigehiko Suzuki, Kobe, Japan

[73] Assignee: Sumitomo Rubber Industries, Ltd., Hyogo-ken, Japan

[21] Appl. No.: 760,569

[22] Filed: Dec. 4, 1996

[51] Int. Cl.[6] .................... B60C 9/18; B60C 9/20
[52] U.S. Cl. .................... 152/534; 152/526; 152/538
[58] Field of Search .................... 152/526, 534, 152/535, 538

[56] References Cited

U.S. PATENT DOCUMENTS

| 3,118,483 | 1/1964 | Beckadolph. | |
|---|---|---|---|
| 5,385,193 | 1/1995 | Suzuki et al. | 152/526 X |
| 5,711,829 | 1/1998 | Pollard et al. | 152/534 X |

FOREIGN PATENT DOCUMENTS

| 0173080 | 3/1986 | European Pat. Off.. |
|---|---|---|
| 77915 | 11/1977 | Luxembourg. |
| 2002699 | 2/1979 | United Kingdom. |

*Primary Examiner*—Adrienne C. Johnstone
*Attorney, Agent, or Firm*—Birch, Stewart, Kolasch & Birch, LLP

[57] ABSTRACT

A motorcycle tire in which the tread face is curved convexly so that the maximum cross-section width of the tire lies between axial edges of the tread portion includes a belt, and the belt comprises at least three plies, wherein the radially inner ply and radially outer ply are made of the same strip of rubberized parallel cords having a strip width of from 85 to 105% the tread width, and the middle ply is made of a strip of rubberized cords having a strip width which is different from that of the inner and outer plies.

4 Claims, 4 Drawing Sheets

MOTORCYCLE TIRE WITH THREE BELT PLIES

BACKGROUND OF THE INVENTION

The present invention relates to a motorcycle tire having a belt structure which can be formed with a simple apparatus without decreasing tire performance.

Recently, as the running speed increases, tires for large-sized motorcycles are required to be improved in both strength and rigidity. Therefore, the number of carcass plies and the number of the belt plies utilized in tires have increased.

On the other hand, in the tire technical fields for other than motorcycle tires, such as, for four wheel vehicles, a belt composed of three or more plies is usually employed, and it is a general knowledge that the ply widths are gradually decreased from the radially inner ply to the radially outer ply.

Therefore, in motorcycle tires, especially for large-sized motorcycles, as shown in FIG. 5, the belts have been formed in the same way such that the ply widths satisfy $b1>b2>b3$. Such a belt is formed by winding strips having different widths. Accordingly, the tire building apparatus which is used to wind the strips must be equipped with strip supplying units of the same number as the belt plies. For example, three strip supplying units are necessary to make a belt composed of three different width plies. As a result, the tire building apparatus becomes complicated and the plant investment increases. Incidentally, if the belt cord thickness and the belt ply thickness are increased in order to avoid increasing the belt ply number, the rigidity of the tread portion becomes excessively high and the ride comfort deteriorates.

SUMMARY OF THE INVENTION

It is therefore, an object of the present invention to provide a motorcycle tire having a belt structure which can maintain or improve the running performances of the tire, without increasing the number of belt strip supplying units. Thus it is possible to simplify the tire building process and decrease the tire manufacturing cost.

According to one aspect of the present invention, the motorcycle tire comprises a tread portion having a convexly curved tread face whereby the maximum cross-section width of the tire lies between axial edges of the tread portion, a carcass extending between bead portions through the tread portion and sidewall portions and turned up around a bead core in each bead portion, a belt disposed radially outside the carcass and inside the tread portion.

Said belt comprising three cut-end plies; a radially innerply, a radially outer ply and a middle ply therebetween, wherein the radially inner ply and radially outer ply are made of the same strip of rubberized parallel cords having a strip width of from 85 to 105% of the tread width, and the middle ply is made of a strip of rubberized cords having a strip width which is different from that of the inner and outer plies.

Preferably, the difference between the strip width of the middle ply and the strip width of the inner and outer plies is 10 to 40 mm.

BRIEF DESCRIPTION OF THE DRAWINGS

Embodiments of the present invention will now be described in detail in conjunction with the accompanying drawings, in which.

DETAILED DESCRIPTION OF THE INVENTION

Figure 1:
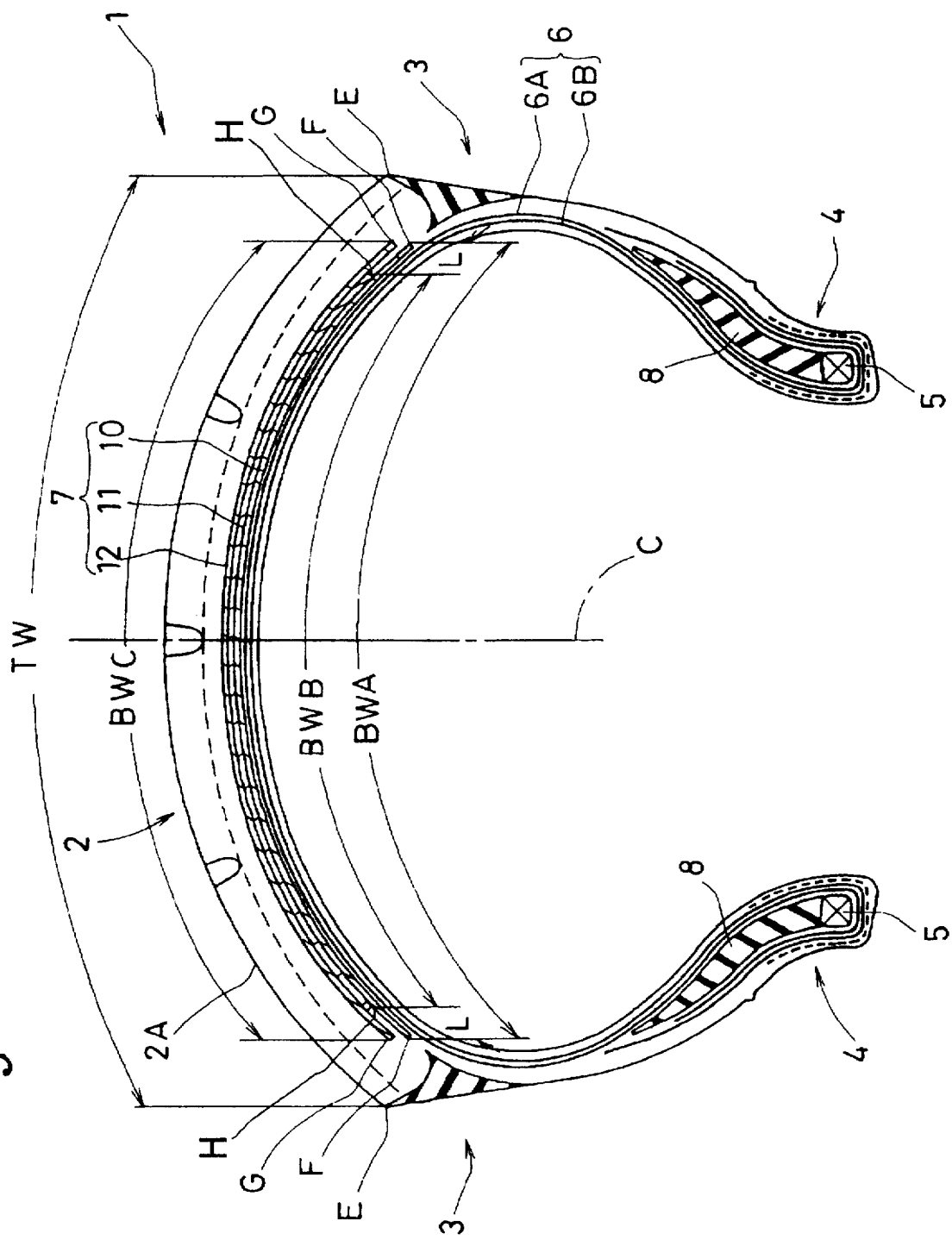
FIG. 1 is a cross sectional view of a motorcycle tire showing an embodiment of the present invention.

In the figures, the motorcycle tire 1 comprises a tread portion 2 of which tread face 2A is curved convexly so that the maximum width section of the tire lies between the tread edges, a pair of bead portions 4 each of which is provided with a bead core 5 therein, a carcass 6 extending between the bead portions 4 and turned up around the bead core 5 in each bead portion, a belt 7 disposed radially outside the carcass 6 and inside the tread portion 2, and a tapered hard rubber bead apex 8 disposed radially outside the bead core 5 in each bead portion.

Figure 3:
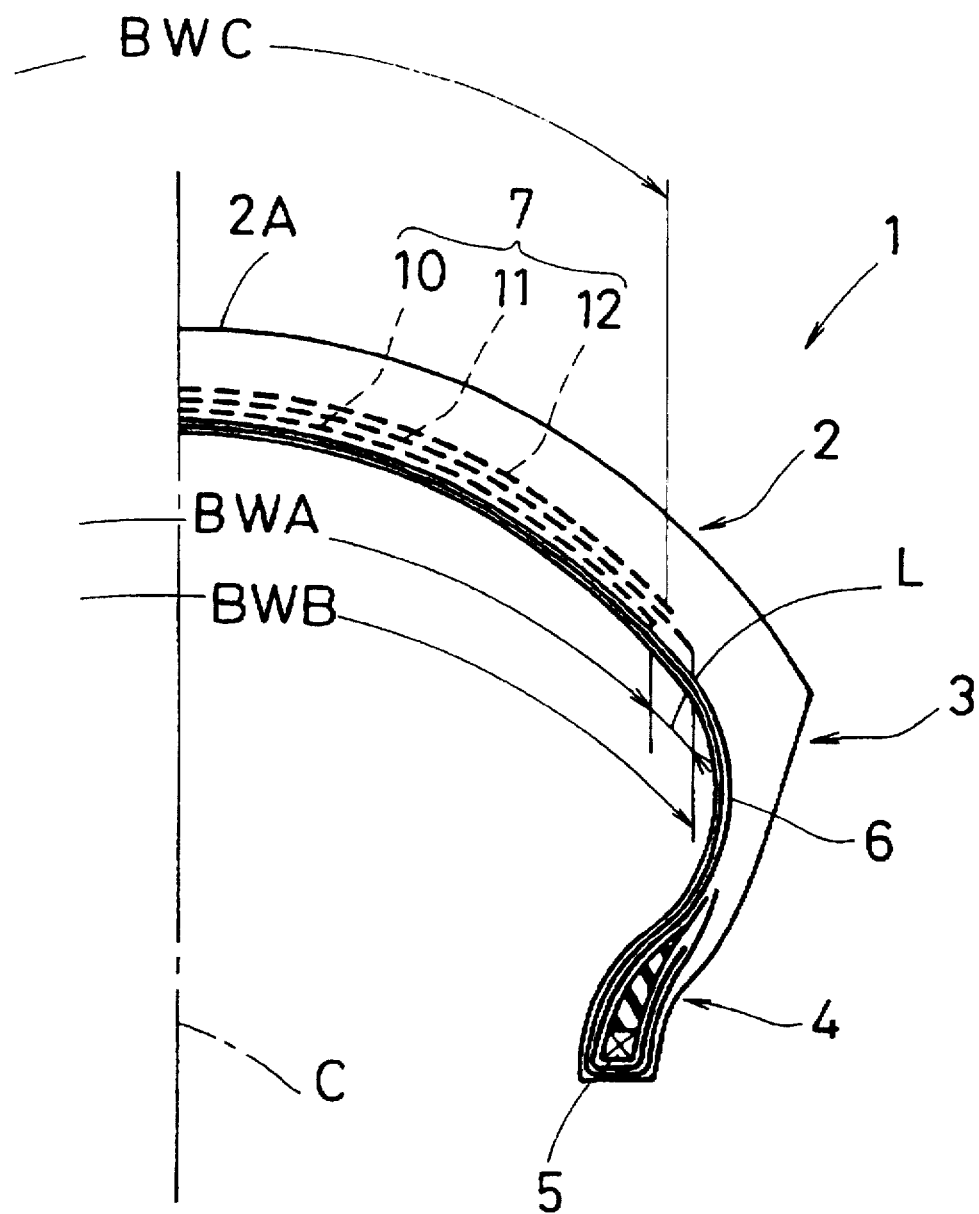
FIG. 3 is a cross sectional view showing another embodiment of the present invention.

The carcass 6 comprises at least one ply, in FIGS. 1 and 3 embodiments two plies 6A and 6B, of carcass cords arranged radially at an angle of from 70 to 90 degrees with respect to the tire equator C. For the carcass cords, organic fiber cords, e.g. nylon, polyester, rayon, aromatic polyamide and the like, are used. When a plurality of plies are used, the carcass cords in each ply are inclined to cross the cords of the adjacent ply.

The belt 7 comprises at least three plies, in FIGS. 1 and 3 embodiments only three plies, of parallel cords 13 laid at an inclination angle of 0 to 30 degrees with respect to the tire equator C. Each belt ply is a so-called cut-end ply in which the axial edges are not folded, that extends continuously from one of the axial edges to the other. For the belt cords 13, organic fiber cords, e.g. nylon, rayon, polyesters, aromatic polyamides and the like and steel cords can be used. Especially aromatic polyamide fiber cords are preferably used.

The radially inner ply 10 and the radially outer ply 12 are formed by winding the same strip of rubberized parallel cords. Accordingly, the plies 10 and 12 have the same strip width, and thus, the arc length BWA of the radially inner ply 10 measured axially along the thickness center line thereof is the same as the arc length BWC of the radially outer ply 12 measured axially along the thickness center line thereof, and the axial edges F and G of the inner ply 10 and outer ply 12 are substantially aligned with each other in the axial direction. The arc length BWA, BWC or strip width of the inner and outer plies is set in the range of from 85 to 105% of the tread width TW, which is measured axially along the tread face 2A from one tread edge E to the other. Thus, with respect to the ply thickness, belt cord material and structure, cord count, cord inclination angle and direction, the inner ply 10 and outer ply 12 are the same.

Figure 2:
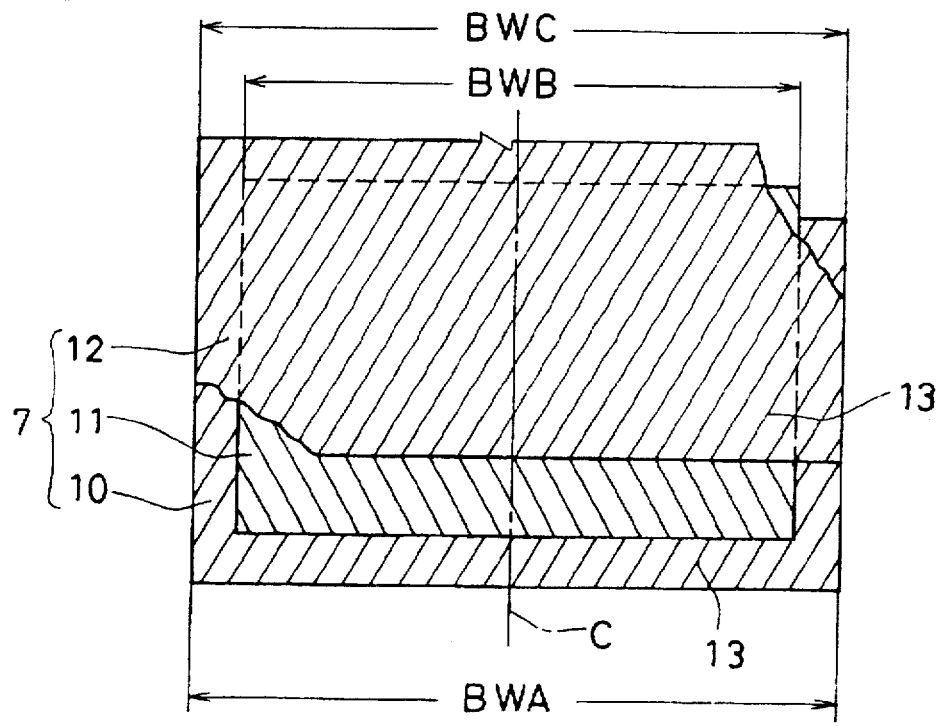
FIG. 2 is a developed plan view of the belt thereof.

On the other hand, the middle ply 11 is formed by winding a strip of rubberized parallel cords of which the strip width BWB is different from that of the inner and outer plies 10 and 12. In FIGS. 1 and 2, the strip width BWB is smaller than the strip width BWA, BWC. However, as shown in FIG. 3, it is also possible to set the strip width BWB larger than the strip width BWA, BWC. In any case, the distance L between the edges H and (F or G) of the middle ply 11 and the belt ply (10 or 12) measured along the curvature is in the range of from 5 to 20 mm. If the distance L is less than 5 mm, as the edges F, H, G approach each other, and the rigidity of the tread portion 2 change greatly at this part, the steering stability during cornering decreases and also the durability of the tread portion decreases. If the distance L is more than 20 mm, a high rigidity portion and a low rigidity portion in the shoulder region of the tread 2 become wide and the cornering and straight running performances decrease.

Figure 4:
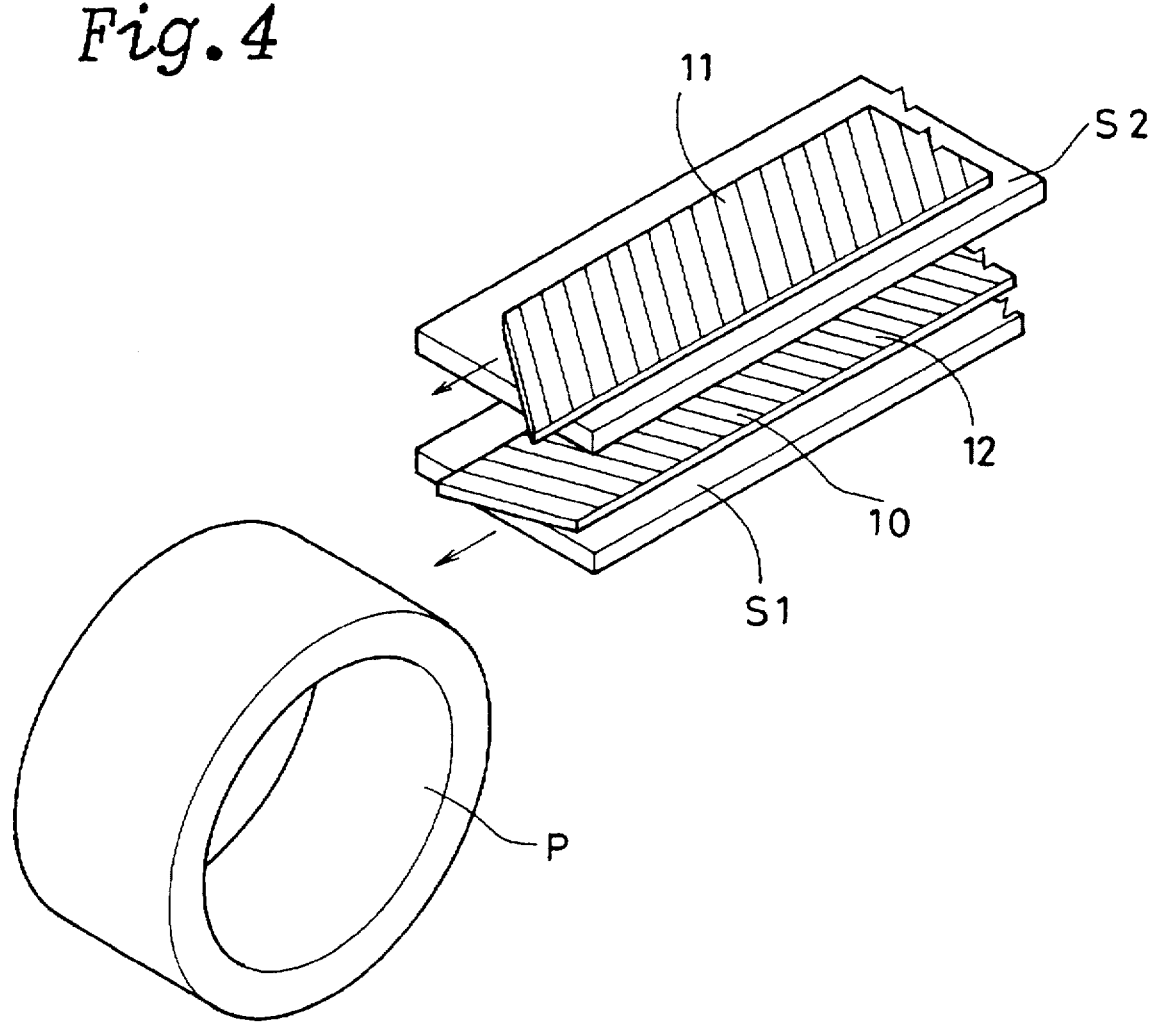
FIG. 4 is a schematic perspective view showing the tire building apparatus.

FIG. 4 schematically shows a tire building apparatus, which comprises a shaping drum P or a shaped carcass around which belt plies are wound, and a first and second supply unit S1 and S2 used to convey a belt cord strip which is wound as the belt ply. Since the inner ply 10 and the outer ply 12 are the same, these plies can be made of a strip supplied by one unit S1, whereas the middle ply 11 is made of a different strip supplied by the other unit S2. Thus, only two units are necessitated to make the three ply belt. Accordingly, as the number of the strip supply units is decreased, the plant investment can be greatly decreased. Further, it becomes possible to utilize existing apparatus which are originally for used to make a two ply belt. Thus, it is possible to reduce the tire manufacturing cost.

The belt cords 13 in the inner ply 10 are inclined in the same direction as the belt cords 13 in the outer ply 12, but the belt cords in the middle ply 11 are inclined in the reverse direction thereto. Therefore, the cords in each ply cross the cords in the adjacent ply and the belt fully displays its hoop effect to increase the rigidity of the tread portion 2.

COMPARISON TEST

Test tires of size 150/80V16 were made by way of test and tested for high speed stability, steering stability, high speed durability, and drum durability. The specifications and test results are shown in Table 1.

1) High speed stability and Steering stability test.

A 1200 cc motorcycle provided on the rear wheel with the test tire was run on a dry surfaced road and the performances were evaluated by the driver's feeling. The results are indicated by an index based on that of the reference tire that is 100, the larger the value, the better the performance.

2) High speed durability test.

This test was conducted in a test course, using the same machine as above. The running speed was increased every 10 minutes in steps of 10 km/h from 200 km/h, and the speed at which the tire breaks is a measurement of its high speed durability.

| Rear | Test tire | |
|---|---|---|
| | Tire size | 150/80V16 |
| | Rim | MT3.50X16 |
| | Pressure | 2.9 kg/sq. cm |
| Front | Tire size | 120/80V16 |
| | Rim | MT2.75X16 |
| | Pressure | 2.5 kg/sq. cm |
| | Carcass cord material | nylon |
| | Carcass cord angle | 28 deg. to tire equator |
| | Number of carcass ply | 2 |
| | Number of belt ply | 2 |
| | Belt cord material | nylon |
| | Belt cord angle | 26 deg. to tire equator |

3) Drum durability test

Using a drum tester, the test tire was run at a speed of 65 km/h under a load of 383 kgf until broken, and the total running distance was measured as the drum durability.

Through these tests it was confirmed that the performances of the example tires were maintained at the same level as the reference tires irrespective of the carcass structure (radial or bias), without increasing the number of strip supply units in a tire building apparatus. In the present invention, therefore, it becomes possible to decrease the tire manufacturing cost, and the tire building apparatus can be widely used for various tires.

In the present invention, the following modifications are also possible: the belt further comprises one or more plies, for example a breaker ply made of a strip of inclined parallel cords, a band ply made of one or more cords laid at substantially zero degree to the tire circumferential direction disposed radially outside the plies 10–12 (e.g. at least one spirally wound cord, and parallel cords in a form of strip) and the like; and the carcass 6 comprises one or more bias plies to produce a bias tire rather than a radial tire.

TABLE 1

Figure 5:
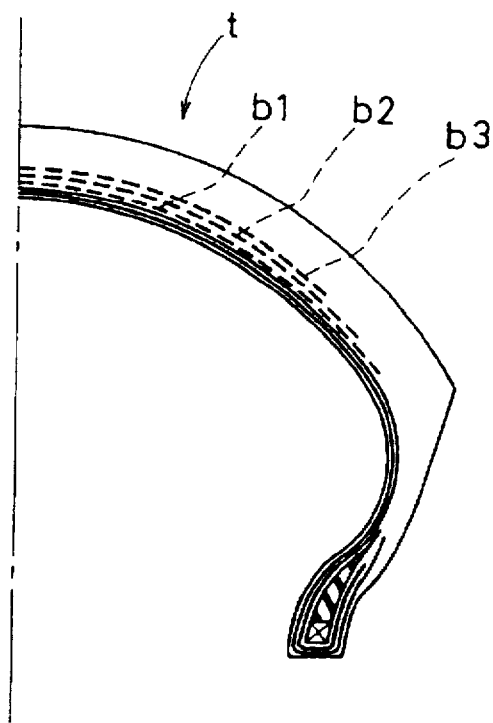
FIG. 5 is a cross sectional view showing a belt according to a prior art.

| Tire | Ex. 1 | Ex. 2 | Ref. 1 | Ex. 3 | Ex. 4 | Ref. 2 |
|---|---|---|---|---|---|---|
| Carcass | | | | | | |
| Ply structure | radial | radial | radial | bias | bias | bias |
| | 2-0 | 2-0 | 2-0 | 2-0 | 2-0 | 2-0 |
| Cord angle (deg) to equator | 88 | 88 | 88 | 30 | 30 | 30 |
| Cord | nylon | nylon | nylon | nylon | nylon | nylon |
| | 2/1890d | 2/1890d | 2/1890d | 2/1890d | 2/1890d | 2/1890d |
| Belt | | | | | | |
| Structure | FIG. 1 | FIG. 3 | FIG. 5 | FIG. 1 | FIG. 3 | FIG. 5 |
| Cord angle (deg) to equator | 18 | 18 | 18 | 18 | 18 | 18 |
| Cord | aramid | aramid | aramid | aramid | aramid | aramid |
| | 2/1500d | 2/1500d | 2/1500d | 2/1500d | 2/1500d | 2/1500d |
| Strip width (mm) | | | | | | |
| Inner ply | 150 | 135 | 150 | 150 | 135 | 150 |
| Middle ply | 135 | 150 | 135 | 135 | 150 | 135 |
| Outer ply | 150 | 135 | 120 | 150 | 135 | 120 |
| Test result | | | | | | |
| High speed stability | 100 | 100 | 100 | 120 | 120 | 120 |
| Steering stability | 100 | 100 | 100 | 110 | 110 | 110 |

TABLE 1-continued

| Tire | Ex. 1 | Ex. 2 | Ref. 1 | Ex. 3 | Ex. 4 | Ref. 2 |
| --- | --- | --- | --- | --- | --- | --- |
| High speed durability | 240 km/h | 240 km/h | 240 km/h | 250 km/h | 250 km/h | 250 km/h |
| Drum durability | complete 15000 km | complete 15000 km | complete 15000 km | complete 15000 km | complete 15000 km | complete 15000 km |

I claim:

1. A motorcycle tire comprising a tread portion having a convexly curved tread face so that the maximum cross-sectional width of the tire lies between the axial edges of the tread portion, a carcass extending between bead portions through the tread portion and sidewall portions and turned up around respective bead cores in each bead portion, a belt disposed radially outside the carcass and inside the tread portion, said belt comprising three cut-end plies; a radially inner ply, a radially outer ply and a middle ply disposed therebetween, the radially inner ply and radially outer ply are made of the same strip of rubberized parallel cords having a strip width of from 85 to 105% the tread width, and the middle ply is made of a strip of rubberized cords, wherein the difference between the strip width of the middle ply and the strip widths of the inner and outer plies is 10 to 40 mm.

2. The motorcycle tire according to claim 1, wherein the middle ply is wider than the inner and outer plies.

3. The motorcycle tire according to claim 1, wherein the middle ply is narrower than the inner and outer plies.

4. The motorcycle tire according to claim 1, wherein the belt consists of said three cut-end plies and the carcass consists of two plies.

\* \* \* \* \*